June 19, 1956  R. P. DIMMER  2,751,546
TWENTY CYCLE GENERATOR
Filed May 15, 1952
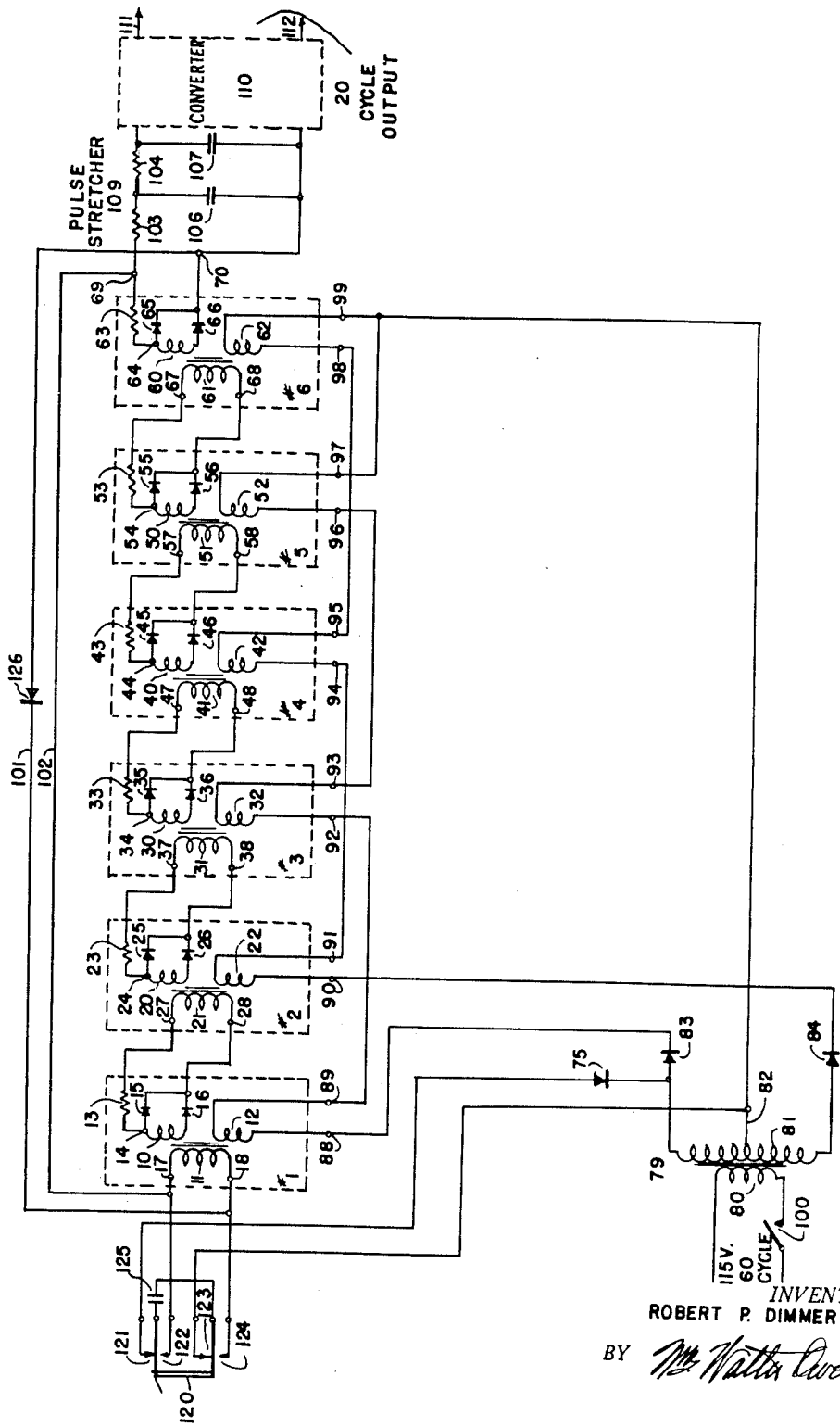
INVENTOR.
ROBERT P. DIMMER
BY
ATTY.

United States Patent Office 2,751,546
Patented June 19, 1956

2,751,546

TWENTY CYCLE GENERATOR

Robert P. Dimmer, Lombard, Ill., assignor to Automatic Electric Laboratories, Inc., Chicago, Ill., a corporation of Delaware Application May 15, 1952, Serial No. 287,973

11 Claims. (Cl. 321—68)

This invention relates to new and useful improvements in frequency reducing systems and more particularly to ringing generators which are operated from a master frequency and are used in a telephone system for signalling purposes.

The object of the invention is to provide a ringing current generator used for signalling purposes which is energized by the ordinary 60 cycle per second power source but which has an output comprised of a lower frequency.

Another object is the novel use of magnetic memory units to achieve frequency transformation from the master frequency without the use of any vacuum tubes and associated circuits.

Further object is to provide for a sinusoidal output of the transformed frequency current without the use of vacuum tubes and associated circuits.

Another object is to provide a novel method of storing an initiating pulse in the magnetic core of the memory unit in the form of residual magnetism which is a prerequisite to the proper operation of the ringing generator.

In the illustrated example, a ringing generator has been developed having an output comprising an alternating ringing current at 20 cycles per second.

There have been many methods presented for generating a 20 cycle ringing voltage, however, the majority of these have a vacuum tube in one form or another. The present system generates a 20 cycle output by selecting one out of every three cycles from the normal 60 cycle power voltage to provide output pulses. Since these output pulses, resembling peak pulses, are of short time duration, they are broadened or "stretched" to resemble the half loops of a sine wave. They are converted into alternating current and then finally amplified, if necessary, by means not employing any vacuum tubes, preferably by a magnetic amplifier. The magnetic memory units, the use of which is the crux of the invention, are standard components manufactured by a number of companies.

The system utilizes a series of magnetic memory units which are divided into two groups of three units per group. Each unit comprises a magnetically retentive core, approximating a toroidal structure, upon which are wound three coils, each coil having a special function. The advancing winding, such as 12 on unit #1, is energized by the power frequency and it functions to magnetize the unit in one direction. The reverse output winding, such as 10 on unit #1, operates on the electromagnetic induction principle and transmits a pulse into the information storage output winding, such as 21 on unit #2, of an adjacent unit for the purpose of reversing the magnetization of the adjacent unit #2. The units forming one group, such as #1, #3 and #5, have their advancing windings serially connected and in series with a rectifier which permits only the negative pulses generated by one half of the alternating current cycle to be admitted for purpose of magnetizating all of the units in the group in a single direction. The units forming the other group, such as #2, #4 and #6, are similarly connected but arranged so that they operate on the rectified pulse of the other half of the alternating current cycle. These also become magnetized in the same direction. The units, which are obtained in pre-magnetized state, are arranged so that the poles of any five of the units are lined up in one direction, while the remaining unit is lined up in the opposite direction.

Upon introduction of the rectified pulse of the first half of the alternating current cycle into the group containing the oppositely poled unit, the oppositely poled unit will induce a positive pulse in its reverse output winding which will pass into the information storage input winding of an adjacent or second unit which is in the other, presently not energized, group. This positive pulse will reverse the magnetization state of the second unit. Upon introduction of the rectified pulse of the second half of the alternating current cycle into the other group, the above second unit will revert to its former magnetized state and at the same time a positive pulse will be similarly induced in its reverse output winding which will be instrumental in reversing the magnetization state of the next adjacent or third unit. The operation is similar for each subsequent introduction of a rectified pulse of each half of the alternating current cycle into the windings of each group in alternative manner. The result is that the last or the sixth unit induces a positive pulse upon receipt of a rectified pulse corresponding to the last half of the third alternating current cycle. This pulse serves two purposes: to reverse the magnetization state of the first unit and to supply an output which upon conversion and amplification, is used to energize a 20 cycle ringer. Operation is similar to the above described manner upon subsequent receipt of a series of rectified pulses, each corresponding to one-half of alternating current cycle received from the power source. The whole procedure may be summarized as follows: An oddly poled magnetic memory unit contains a stored pulse in the form of residual magnetism which is moved progressively from one unit to the next unit, each movement effective upon receipt of a rectified pulse corresponding to each alternation of the power frequency source. Output is taken from the last unit for ringing or other purposes.

The method shown for obtaining 20 cycle ringing current may be used to obtain other ringing frequencies such as 30, 15, 7½ cycles per second or any other multiple of 60 C. P. S. using more or less of the magnetic storage units.

The novel features considered to be characteristic of the invention are set forth in detail in the appended claims. The invention as to its method of operation together with further objects and advantages thereof will be understood by reference to the specification taken in connection with the accompanying drawing which presents only one of the various embodiments that are possible.

Energizing frequency may be obtained from any convenient source of commercial A. C. power, such as the 115 volt, 60 cycle source shown in the drawing. To simplify the discussion as to the mode of operation, the magnetic storage units #1–#6 shall be merely called units and are connected as shown in the drawing. The advancing windings 12, 32 and 52 have been interconnected between their respective leads 88—89, 92—93 and 96—97; and similarly, the advancing windings 22, 42 and 62 have been interconnected between their respective leads 90—91, 94—95 and 98—99. Upon the introduction of a negative pulse into the respective advancing windings, the units are all magnetized in a single direction, say downward. This downward condition of magnetization shall be called state O and the upward condition of magnetization shall be called state I. Windings 11, 21, 31, 41, 51 and 61 are the information storage input windings. Windings 10, 20, 30, 40, 50 and 60 are the reverse output windings. The output of these reverse output windings is fed into the information storage input windings of the next progressive units. The units as obtained from the manufacturer are already in a magnetized state corresponding to either state O or state I, and are assembled for purposes of this invention in such a manner as to have any five units poled in one direction and the lone unit poled in the opposite direction. This procedure of assembly of magnetically aligning the units in the above mentioned manner is termed "poling." It will be assumed that the unit which is out of step with the remaining units is unit #1. Hence prior to operation, unit #1 is in state I and the remaining units 2–5 are all in state O.

Alternating current is applied to the primary winding 80 of the power transformer 79 by closing the switch 100. Assuming that the first half of first cycle of the alternating current is such as to make the top of the secondary winding 81 of positive polarity, the current flow will be from top of the secondary winding 81, through the rectifier 83, through the windings 12, 32 and 52 and back to the secondary winding 81 by way of the centertap 82, thus completing the circuit. The effect is to magnetize the units #1, #3 and #5 in a downward direction, i. e., to place them in state O. But it will be recalled that unit #1 was in state I prior to introduction of the rectified pulse. As a result of this rectified pulse, also called the negative pulse because of its downward magnetizing characteristic, the magnetization of unit #1 was changed from its previous state I to state O. During the passage of the rectified pulse corresponding to the first half of the first cycle of alternating current through the winding 12 of the unit #1, a voltage is induced in the reverse output winding 10 which causes the current to flow from the bottom end of winding 10 through the rectifier 16, through the information storage input winding 21 of unit #2, back through the resistor 13 of unit #1 to the point 14 on top of the winding 10 thus completing the circuit. The nature of this induced pulse is positive and its effect is to magnetize unit #2 in the upward direction thus reversing its previous magnetization which was downward. It should be pointed out that unit #2, during the receipt of this positive pulse, is in a quiescent state, that is, it is not receiving during this period any rectified pulse through its winding 22 from the transformer 79. Similarly, a pulse is induced of such nature in the other winding 11 as to make the bottom of this winding assume positive polarity which would tend to compel current to move from the point 18 over the line 101 into the reverse output winding 60 of unit #6. But the arrangement of the rectifiers 65 and 66 in unit #6 is such as to prevent such flow. Rectifier 126 also prevents any current flow from winding 11 to the output circuit at this time. Rectifiers 65 and 66 and resistor 63 act as a blocking circuit to the pulse induced in the winding 11 of unit #1. Similarly the rectified pulse passing through the winding 32 of the next member of the group, unit #3, will induce a pulse in the winding 30 which will be forwarded into the winding 41 of the adjacent unit, unit #4. But the pulse induced in the unit #3 is a negative pulse because unit #3 is in state O. This negative pulse magnetizes the unit #4 in the downward direction, but since this unit is already in state O, no reversal of magnetization occurs. The same explanation is applicable to the last member of the group, unit #5, and its pulse recipient, unit #6. At this stage, unit #2 is in state I and the others are in state O. The rectified pulse corresponding to the last half of the first cycle of alternating current will cause the bottom of the secondary winding 81 to assume positive polarity in contradistinction to the first part of the cycle and cause the current to flow from the bottom of the secondary winding 81 through the rectifier 84, through the windings 22, 42 and 62 back to the secondary winding 81 through the centertap 82. The effect of the current flow is to magnetize in a downward direction the units possessing the above mentioned windings namely, units #2, #4 and #6. At this moment, a voltage is induced in the reverse output winding 20 of unit #2 causing a positive pulse to be sent into the information storage input winding 31 of unit #3, thus changing its previous state O to state I. The pulse induced in the winding 21 of unit #2 is blocked out by the rectifiers 15 and 16 and the resistor 13 in unit #1. At this stage, unit #3 is in state I and the remaining units are in state O. The rectified pulse corresponding to the first half of the second cycle of alternating current will cause the current to flow through the windings 12, 32 and 52 of the units #1, #3 and #5, respectively, causing a downward magnetization. Since unit #3 is in state I, it will be changed to state O at the same time inducing a positive pulse in the winding 30 which is connected to the information storage input winding 41 of the succeeding unit #4. As a result of this positive pulse, the former magnetization of unit #4 is changed to state I. The pulse induced in the other winding 31 has no egress because of the blocking rectifiers and resistor found in the previous unit #2. At this stage, unit #4 is in state I and the others are in state O. The rectified pulse representing the last half of the second cycle of alternating current will cause the current to flow in windings 22, 42 and 62 of the units #2, #4 and #6, respectively, causing magnetization in the downward direction. Since unit #4 is in state I, it will be changed to state O and the positive pulse induced in winding 40 will be instrumental in changing the magnetization of unit #5 from state O to state I by flowing through the winding 51 of unit #5. The pulse induced in winding 41 will remain ineffective because of the blocking circuit of the previous unit #3. At this stage, unit #5 is in state I and the others are in state O. The rectified pulse corresponding to the first half of the third cycle of alternating current causes the current to flow in windings 12, 32 and 52 of the units #1, #3 and #5, respectively, and magnetize these units in a downward direction. Since unit #5 is in state I, it will be changed to state O and the positive pulse induced in the winding 50 will be sent to the winding 61 of the unit #6 thereby changing its previous magnetization to state I. The pulse induced in winding 51 is ineffective because of the blocking circuit contained in unit #4. At this time, unit #6 is in state I and the other units are in state O. The rectified pulse corresponding to the last half of the third cycle of alternating current causes the current to flow through the windings 22, 42 and 62 thereby causing the units #2, #4 and #6, respectively, to magnetize in a downward direction or state O. Since unit #6 was in state I, its magnetization will be reversed to state O. The pulse induced in winding 61 is constrained to its locality by the blocking circuit of unit #5. The positive pulse induced in the reverse output winding 60 is sent back over the lines 101 and 102 to the information storage input winding 11 of unit #1. This results in reversal of magnetization of unit #1 from state O to state I. The output of the winding 60 is fed into a circuit arrangement called the pulse stretcher 109. It is evident at this time that one positive pulse is produced at the output terminals 69 and 70 for every three cycles of alternating current impressed across the power transformer 79. The ratio of the frequency of the output at the terminals 69 and 70 to the frequency of the input at transformer 79 is 1:3 or 20:60. As a result of this invention, a new frequency signal may be obtained which is one-third of the input frequency. The pulse induced in the winding 60 is of high magnitude and of short duration and the purpose of the pulse stretcher 109 is to broaden or stretch the pulse so that the interval between the pulses may be shortened. The pulse stretcher utilizes a pair of resistors 103 and 104 in conjunction with the condensers 106 and 107. The output from the pulse stretcher 109 is fed into the converter 110. If necessary, the converter may have incorporated therein an amplifier. The incorporated amplifier may be any one of the well known types especially those which do not use vacuum tubes for amplification purposes such as the magnetic amplifiers. The input into the converter 110 consists of a series of pulses which resemble the half sine wave output of a full wave rectifier. The output from the converter 110 consists of alternating current of 20 cycles per second frequency and which is available at the terminals 111 and 112.

Instead of employing the pulse stretcher and the converter, the output can be directly taken off from the terminals 69 and 70 and introduced directly into a ringer which is adapted for operation upon direct receipt of such signal output. The pulse stretcher and the converter shown in the present embodiment are only representative of the multitude of such devices that may be employed in effecting similar results.

Earlier in the discussion concerning the operation of the invention, it was brought out that the magnetic memory units were properly poled before assembly. It is quite possible that the units may be improperly assembled so that all of the units show magnetization in one common direction. If this was so, the ringing generator would be inoperative and no 20 cycle per second output would be realized. Another cause of inoperativeness would be due to loss of retentive magnetization of the odd unit which was previously magnetized into state I. To overcome these difficulties, a novel feature, comprising a positive pulse start switch 120, has been added. Assuming that all of the units are magnetized in one direction, for instance in the downward direction, or that unit #1 has for some reason lost its previous magnetization, state I, the ringing generator may be activated by use of the switch 120. As is evident from the drawing, condenser 125 is always in a charged condition due to initial flow of current from the centertap 82 of the secondary transformer 81, through the break contacts 123, through condenser 125, through the break contact 121, through the rectifier 75, and back to the top of the secondary winding 81. Depressing momentarily the switch 120 at any time when the alternating current of the power source is changing its polarity will cause the condenser 125 to discharge a positive pulse into the information storage input winding 11 of the unit #1 causing the reversal of its magnetization from state O to state I. The positive pulse would flow from the right side of the condenser through the make contacts 124, into the winding 11 of unit #1, out of the winding 11, and through the make contacts 122 to the left side of the condenser 125. The blocking circuit found in unit #6 prevents the application of this positive pulse to the winding 60. Should difficulty be experienced in depressing the switch 120 at the opportune moment, another method is available. Close the switch 100 and allow condenser 125 to become charged and then open up the switch 100. Immediately thereafter, depress switch 120 which will allow the condenser to discharge its stored pulse over the path hereinbefore described and thus magnetize the core of unit #1 in the proper direction. Subsequently, close the switch 100 and the generator is ready for use.

While there has been described what is at present considered to be the preferred embodiment of the invention, it is to be understood that various modifications may be made thereof, and it is contemplated in the appended claims to cover all such modifications within the true spirit and scope of the invention.

What is claimed is:

1. A frequency reducing system comprising a plurality of interconnected magnetically retentive, memory storage units connected in a ring circuit, one of said units magnetized in a particular direction and the other units having a different state of retained magnetism, means for causing full wave rectification of received alternating current to thereby obtain pulses of the same polarity, means for connecting said memory storage units to said rectifying means, said connecting means effective in response to the receipt of the first rectified pulse to reverse the magnetization of said one unit, means interconnecting each of said units with a succeeding unit for reversing the magnetization of the succeeding unit, said reversing means effective in response to the reversal of magnetization in said first unit to reverse the magnetization of the next unit, said reversing means in each unit effective in response to reversal of magnetization of the previous unit, said change in magnetization of each unit corresponding momentarily to the received pulses, an output circuit, means responsive to the reversal of magnetization in the last unit for transmitting a pulse into said output circuit, the output of said last unit comprising a series of pulses occurring at the frequency which is a submultiple of the input frequency.

2. In the combination as claimed in claim 1, a manually operative device, means operated in response to operation of said device for impressing a pulse on one of said magnetic memory units and magnetizing it in a particular direction to thereby store a pulse in the form of residual magnetism therein.

3. In the combination as claimed in claim 2, means for smoothing out the series of output pulses of said system, said means effective in response to receipt of each pulse for expanding said pulse to diminish the period of time between successive pulses.

4. In the combination as claimed in claim 3, means for transforming said series of pulses into alternating current and for increasing the magnitude of the transformed alternating current, said means effective in response to the receipt of said output pulses for transforming and amplifying said pulses whereby the output is sufficient to operate external devices.

5. A frequency transformer comprising a plurality of interconnected polarity shifting units connected in a ring circuit and arranged in equal groups, each unit containing states of magnetism therein in the form of residual magnetism, one unit having a residual magnetism differing from that of the other units, an input master signal frequency, means connecting said units to said input, means in said units effective in response to receipt of each half cycle of said master frequency for progressively shifting the residual magnetism of said one unit from the first to the last of said units, an output circuit, means for transmitting a pulse from the last unit to the first unit and to said output circuit each time the residual magnetism of said last unit is changed, said output circuit effective in response to the receipt of said pulse for transforming same to alternating current having a frequency lower than said master signal frequency.

6. In the combination as claimed in claim 5, a manually operable control, means operable responsive to operation of said control for initially storing a state of magnetism of one polarity in the form of residual magnetism in one of said polarity shifting units whereby the frequency transformer is prepared for operation.

7. In a frequency reducing system having an output, a source of alternating current of a certain frequency, a counting arrangement comprising a plurality of interconnected magnetically retentive units connected in a ring circuit and connected in equal groups to said source of current, a circuit including a rectifier linking one group of said units to the source and another circuit including another rectifier linking another group of said units to the source, the first of said units magnetically poled in a first direction to provide one state of magnetism therefor and the remaining units in a second direction to provide another state of magnetism therefor, one of said circuits associated with the first unit in the ring effective in response to the receipt of the first half cycle of the current of said source to magnetically energize said one group of units, means interconnecting each said unit to the succeeding unit, said interconnecting means effective in response to said energization to change the polarization of said first unit in the first group to the second direction and to change the polarization of the first unit of the second group of the first direction, each of said circuits in cooperation with said interconnecting means alternately responsive to the receipt of succeeding half cycles of the current of said source to successively change the state of magnetism of succeeding units in the groups and to transmit a pulse to the output of the system, said output responsive to the pulse transmitted responsive to the receipt of the last half cycle of a predetermined one of the cycles.

8. A frequency reducing system such as claimed in claim 7, including a converting system connected in said output, said converting system effective in response to the receipt of said pulses for converting said pulses to an alternating current.

9. A frequency reducing system comprising a series of interconnected magnetic devices each having a particular state of retained magnetism, one of the devices having a different state of magnetism than the others, an alternating current source of one frequency, means linking said source to said devices for rectifying each half cycle of the current fed from said source and for applying a pulse in accordance therewith to a part of said devices, means interconnecting said devices in a ring circuit, said pulse effective to change the state of magnetization of said one device and said interconnecting means effective to also change the state of magnetization of one of said other devices, said interconnecting means operated responsive to the receipt of succeeding pulses to cause changes in the state of magnetization of said devices successively, an output circuit, said output circuit operated in response to the change in magnetization of the last device of the series to produce alternating current, whereby said alternating current is of a frequency which is a sub-multiple of the frequency of said source.

10. In a frequency reducer having an output, a series of magnetic units connected in a ring circuit and linked by rectifier means to a source of current of one frequency, said units arranged in equal groups, said means rectifying each half cycle of the current from said source and applying said rectified current in pulses to said units successively in groups, one unit having one retained state of magnetism and the other units having another state of magnetism, said units including other means therein effective in response to the receipt of said pulses for absorbing a series of said pulses for successively changing the state of magnetism of said units to said one state and applying only a single pulse to said output, the frequency of said output being a sub-harmonic of the frequency of the source.

11. A frequency reducing system comprising a plurality of memory storage units connected in a ring circuit, link circuits connecting said coils in two equal groups, the cores of said coils having information stored therein in the form of residual magnetism, said cores being magnetically retentive, an input for said link circuits connected to a source of current of a master signal frequency, the information stored in said units consisting of one of said units in one group having one state of magnetism retained therein and the remaining units having another state of magnetism retained therein, means in the input circuit responsive to one half cycle of the said master frequency to apply a pulse to the units of one group to thereby change the state of magnetism of said one unit and transfer said state to another of said units in the other group, the successive half cycle of the master frequency thereby moving the stored information from one coil to another until the state of magnetism of the last of said units has been changed to one state, an output circuit, means responsive to the changing of the state of magnetism of said last unit of said groups for restoring said one unit to said one state of magnetization and for transmitting an impulse to said output circuit, and means in the output circuit for transforming said impulses into a current having a frequency lower than said master signal frequency.

References Cited in the file of this patent

UNITED STATES PATENTS

| | | |
|---|---|---|
| 2,519,513 | Thompson | Aug. 22, 1950 |
| 2,640,164 | Giel | May 26, 1953 |
| 2,652,501 | Wilson | Sept. 15, 1953 |

OTHER REFERENCES

"An Electronic Digital Computor," article in Electronic Engineering of December 1950, pages 492–498.

"Ferroresonant Flip-Flops," article in April 1952, Electronics, pages 121–123.

Article in Electronics, page 121, of April 1952, by Isborn.

Article in Proceedings of the I. R. E., page 401, of April 1951, by Wang.